US006633770B1

(12) United States Patent
Gitzinger et al.

(10) Patent No.: US 6,633,770 B1
(45) Date of Patent: Oct. 14, 2003

(54) TELECOMMUNICATION DEVICE HOLSTER HAVING A RETRACTABLE EARPIECE ASSEMBLY INTEGRATED WITH THE HOLSTER

(76) Inventors: Tom Gitzinger, 1515 Rhett Pl., Woodstock, IL (US) 60098; Michael L. Charlier, 931 N. Saratoga Dr., Palatine, IL (US) 60067

( * ) Notice: Subject to any disclaimer, the term of this patent is extended or adjusted under 35 U.S.C. 154(b) by 0 days.

(21) Appl. No.: 09/502,583

(22) Filed: Feb. 11, 2000

(51) Int. Cl.[7] .................................................. H04M 1/00

(52) U.S. Cl. .................. 455/575.1; 455/90; 455/550.1; 379/400; 379/431; 379/433.03; 224/196; 224/667; 224/191; 224/929; 224/930; 248/316.1; 248/316.7

(58) Field of Search .......................... 455/90, 575, 568, 455/550; 379/430, 431, 433.03, 440, 446, 438, 455; 224/196, 667, 191, 929, 930; 248/316.1, 316.7

(56) References Cited

U.S. PATENT DOCUMENTS 5,299,670 A * 4/1994 Willard ..................... 191/12.2
5,388,155 A * 2/1995 Smith ......................... 379/446
5,724,667 A * 3/1998 Furuno .................... 455/575.2
5,832,098 A * 11/1998 Chen .......................... 381/370
6,374,126 B1 * 4/2002 MacDonald et al. ..... 455/569.1
6,542,757 B2 * 4/2003 Bae ............................ 455/568
2002/0176571 A1 * 11/2002 Louh .......................... 379/455
2002/0190176 A1 * 12/2002 Louh ...................... 248/316.4

* cited by examiner

*Primary Examiner*—William Trost
*Assistant Examiner*—Danh C Le
(74) *Attorney, Agent, or Firm*—Daniel R. Collopy; Randall S. Vaas; Lawrence J. Chapa

(57) ABSTRACT

A holster (10) for a telecommunication device (12), such as a cellular telephone or wireless telephone, includes a housing (14) adapted to removably support the telecommunication device (12). The holster (10) also includes an earpiece assembly (52) including at least one transducer, such as an earbud (53) or a microphone (54), and a cord (56) depending from the at least one transducer (53, 54). The earpiece assembly (52) is extendable and retractable relative to the housing (14). The holster (10) further includes an extension/retraction assembly (32) having a spool (34) for taking up at least a portion of the cord (56) when the earpiece assembly (52) is retracted relative to the housing (14), and at least one coil spring (35) adapted to rotate the spool (34). The at least one coil spring (35) can electrically couple the at least one transducer (53, 54) to the telecommunication device (12).

19 Claims, 5 Drawing Sheets

TELECOMMUNICATION DEVICE HOLSTER HAVING A RETRACTABLE EARPIECE ASSEMBLY INTEGRATED WITH THE HOLSTER

BACKGROUND OF THE INVENTION

The present invention relates to the telecommunications arts. The preferred embodiment of the invention finds particular application in conjunction with a holster for a portable (i.e. cellular, wireless, etc.) telephone that couples voice signals between the portable telephone and an extendable/retractable earpiece assembly that is integrated with the holster, and will be described with particular reference thereto.

Holsters for portable telephones are known. A separate earpiece assembly, generally including an ear bud, microphone, and depending cord, is typically plugged into a bayonet-type headphone/microphone jack associated with the portable telephone or holster when using the portable telephone in a "hands-free" manner. However, when not using the portable telephone, the separate earpiece assembly must either be disconnected from the portable telephone/holster and stored somewhere, or loosely wrapped around or draped over the portable telephone/holster. In either case, it is a nuisance to reconnect the earpiece assembly or unwrap the earpiece assembly when placing or answering a subsequent telephone call.

Accordingly, it is considered desirable to provide a new and improved portable telephone holster and method for coupling voice signals between the telephone and a retractable earpiece assembly that is integrated with the holster, that meets the above-stated needs and overcomes the foregoing difficulties and others while providing better and more advantageous results.

SUMMARY OF THE INVENTION

In accordance with one aspect of the present invention, a holster for a telecommunication device is disclosed. The holster includes a housing adapted to removably support the telecommunication device, and an earpiece assembly including at least one transducer and a cord depending from the at least one transducer. The earpiece assembly is extendable and retractable relative to the housing. The holster further includes an extension/retraction assembly including a spool for taking up at least a portion of the cord when the earpiece assembly is retracted relative to the housing, and at least one coil spring adapted to rotate the spool. The at least one coil spring electrically couples the at least one transducer to the telecommunication device.

In accordance with another aspect of the present invention, a holster for a telecommunication device is disclosed. The holster includes a housing having an internal cavity and a mechanism adapted to removably support the telecommunication device. An earpiece assembly includes at least one transducer and a cord depending from the at least one transducer. The earpiece assembly is extendable and retractable relative to the housing. An extension/retraction assembly of the holster includes a spool positioned within the internal cavity for taking up at least a portion of the cord when the earpiece assembly is retracted relative to the housing. The extension/retraction assembly includes a mechanism for rotating the spool to retract the earpiece assembly relative to the housing.

One advantage of the present invention is the provision of a holster for a telecommunication device that includes an integral earpiece assembly that can be extended and retracted relative to the holster.

Another advantage of the present invention is the provision of a holster for a telecommunication device that incorporates an earpiece extension/retraction assembly.

Yet another advantage of the present invention is the provision of a holder for a telecommunication device including an extension/retraction assembly that couples audio/voice signals between the telecommunication device and a retractable earpiece assembly.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENTS(S)

Figure 1:
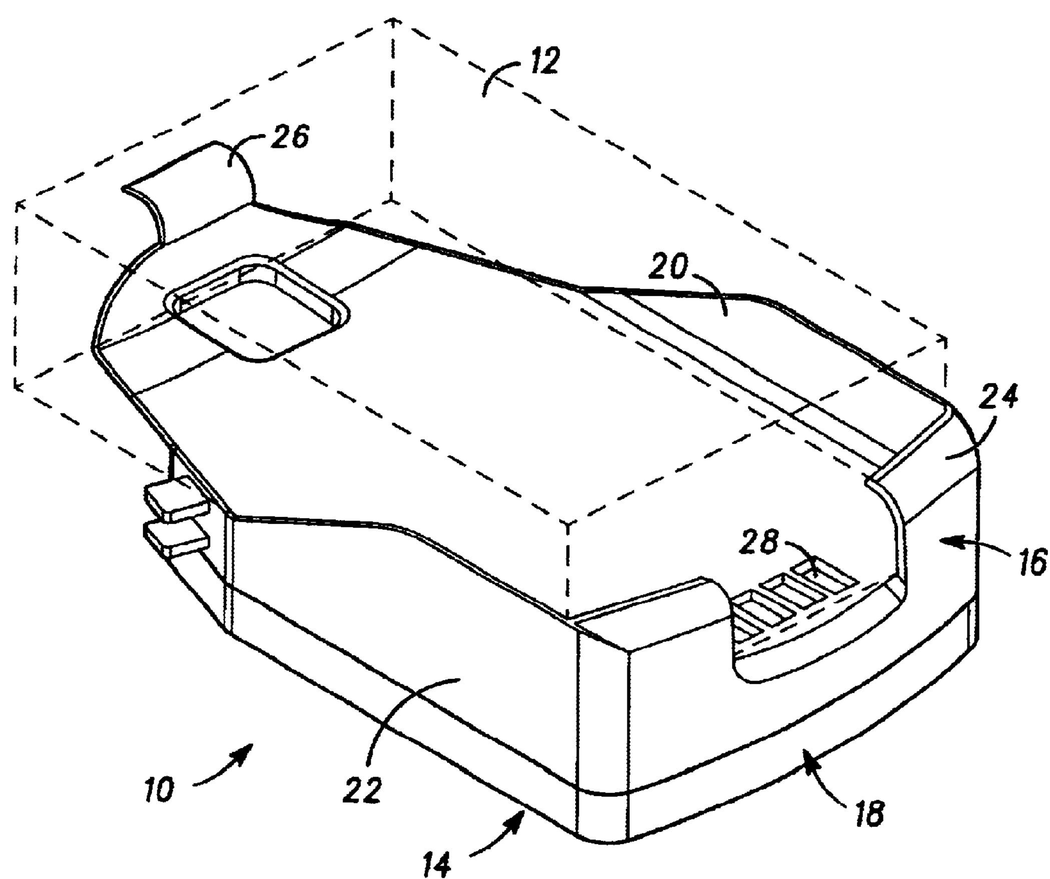
FIG. 1 is a perspective view of an exemplary portable telephone (phantom) removably secured to a holster that incorporates the features of the present invention therein.
Figure 2:
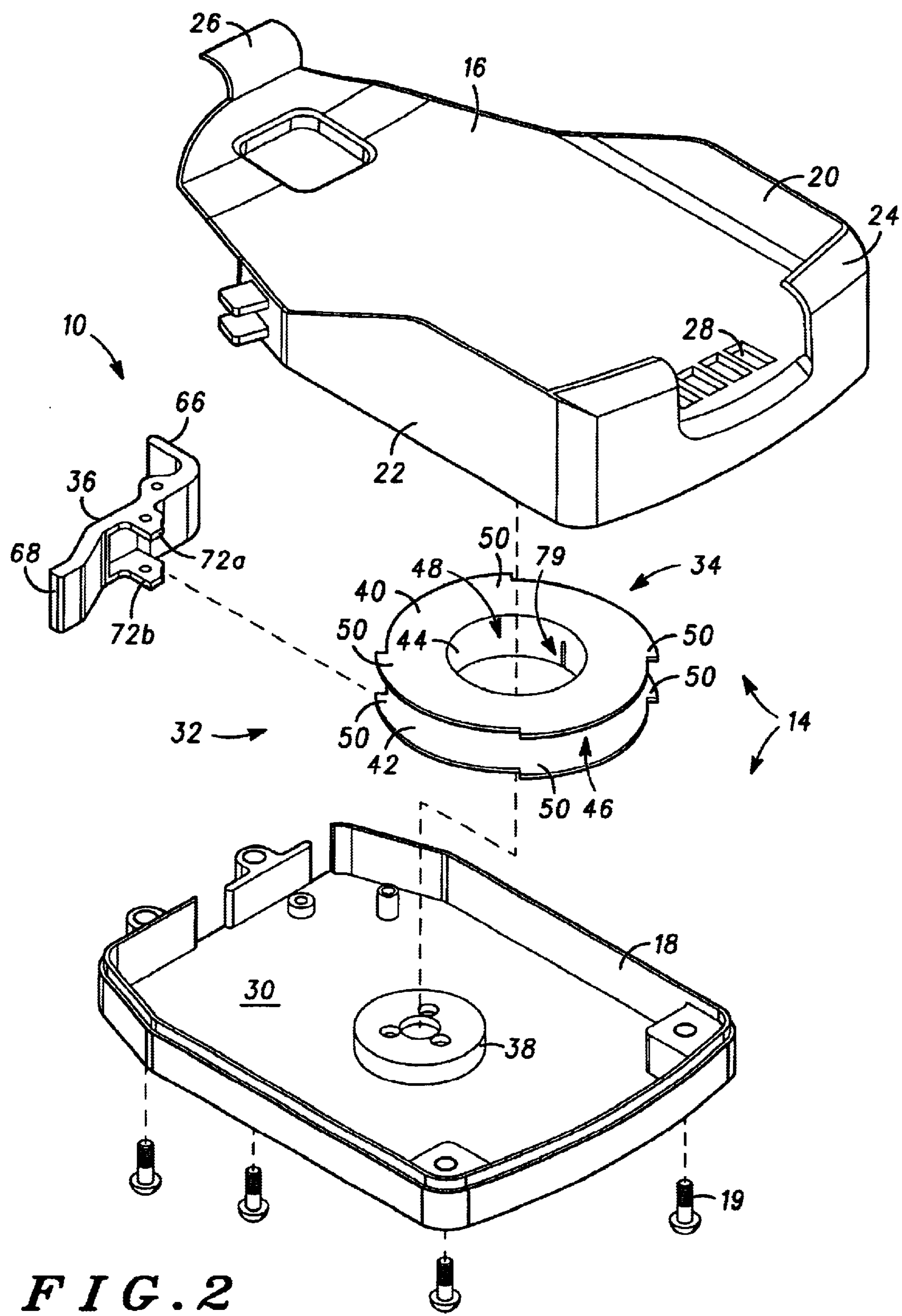
FIG. 2 is an exploded view of the holster of FIG. 1 showing components of an extension/retraction assembly housed within an internal cavity of the holster.

Referring now to FIGS. 1 and 2, a holster 10 secures and retains, or otherwise removably holds, a conventional portable telephone 12 (shown in phantom), such as a cellular telephone, wireless telephone, etc. The holster 10 includes a housing 14 having an upper section 16 and a lower section 18 joined to the upper section by conventional attachment means 19 such as threaded screws, locking tabs, etc.

The upper housing section 16 include means for securely retaining or otherwise holding the telephone 12 such as side walls 20, 22, end wall 24, and cantilevered spring arm 26. The spring arm 26 resiliently urges the telephone 12 into abutment with the end wall 24 to prevent the telephone from freely moving relative to the holster 10. The upper housing section 16 also includes a number of electrical contacts 28 that physically mate with corresponding electrical contacts (not shown) associated with the telephone 12, when secured to the holster, to establish electrical communication between the telephone band the holster.

The upper and lower housing sections 16, 18 cooperate to define an internal cavity 30 for housing an extension/retraction assembly 32 including a rotatable spool 34, a coil spring assembly 35 (FIG. 3), and a control arm 36. The lower housing section 18 includes a raised, circular hub 38 for rotatably supporting the spool 34. The spool 34 includes a first annular sidewall 40 and a second annular sidewall 42 spaced from the first sidewall 40 by a circular center wall 44 extending transverse to the sidewalls. The sidewalls 40, 42 and the center wall 44 cooperate to define a U-shaped annular cavity 46 radially outward of the center wall 44. A circular central cavity 48 is defined radially inward of the center wall 44. The radially outer circumferential edge of each sidewall 40, 42 is undulated to define a plurality of circumferentially-spaced ratchet teeth 50.

Figure 3:
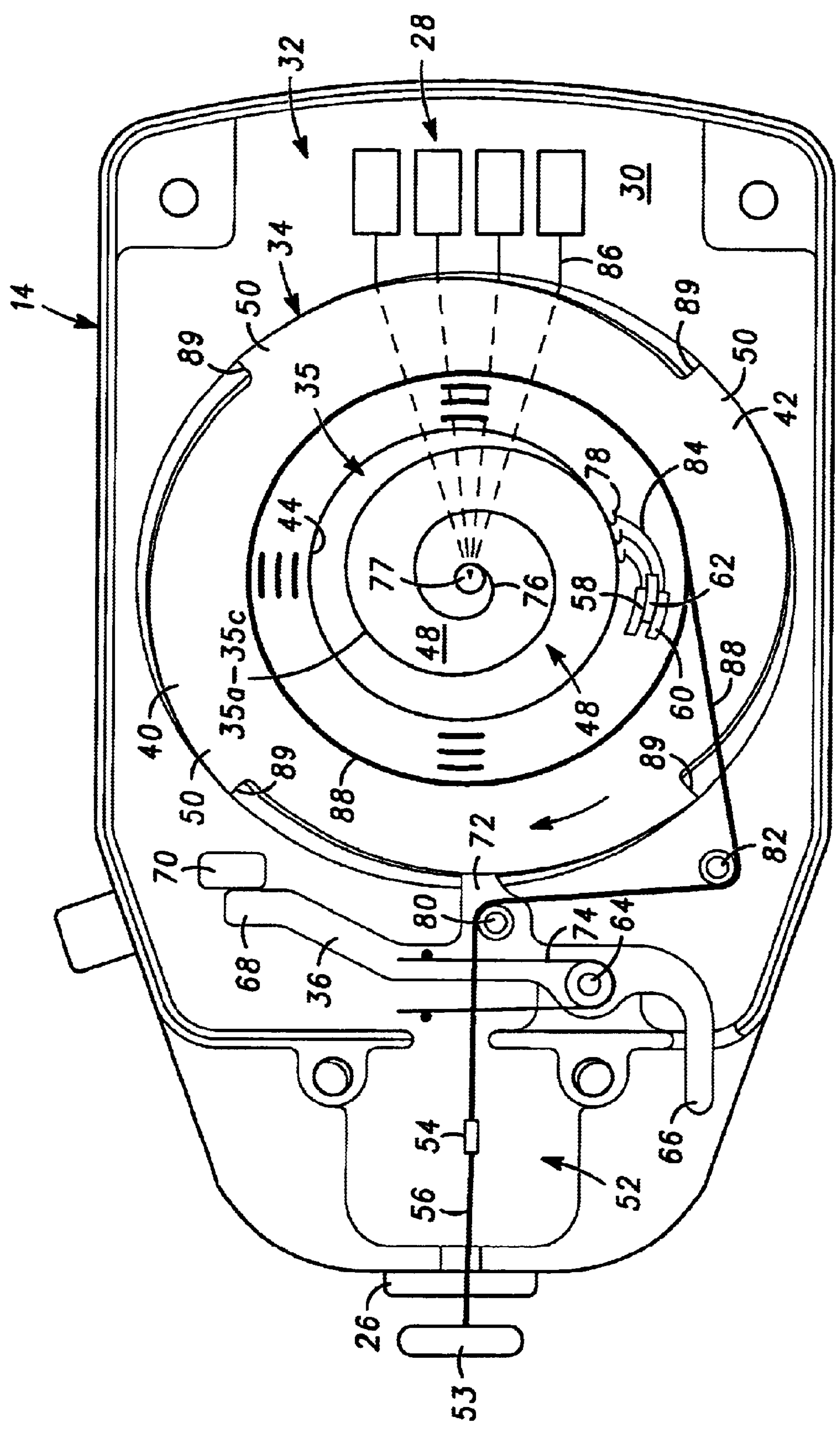
FIG. 3 is a bottom plan view of the holster showing an earpiece assembly, slightly extended from the holster, and the extension/retraction assembly in accordance with a first embodiment of the present invention.

Referring now to FIG. 3, an earpiece assembly designated generally as 52 includes at least one transducer such as earbud 53 and microphone 54. The earpiece assembly 52 also includes an electrical cord 56 depending from the at least one transducer. The electrical cord 56 comprises at least one insulated ground wire 58 for coupling an electrical ground potential to the earbud and microphone, an insulated earbud wire 60 for coupling voice signals from the holster to the earbud 53, and an insulated microphone wire 62 for coupling audio signals to the holster from the microphone 54.

As best shown in FIG. 3, the control arm 36 pivots about a pin 64 associated with the housing 14. The control arm 36 includes a first end 66 protruding from the housing 14, a second end 68, shown in abutment with a stop 70 associated with the housing 14, and at least one intermediate finger 72. With the spool 34 positioned on the hub 38 as shown, a spring 74 urges the control arm second end 68 into abutment with the stop 70 such that the at least one finger 72 projects radially inward of the radially outermost extent of the teeth 50 associated with a corresponding one of the first and second spool sidewalls 40, 42. As shown in FIG. 2, it is contemplated that the control arm 36 could include two intermediate fingers 72 such that a first finger **72*a* cooperates with the ratchet teeth 50 associated with the first spool sidewall 40, and a second finger 72*b* cooperates with the ratchet teeth 50 associated with the second spool sidewall 42**.

With continuing reference to FIG. 3, the coil spring assembly 35 includes three, separate, insulated coil springs **35*a*–35*c* in stacked alignment one on top of another within the central cavity 48 of the spool 34. The inner ends 76 of the coil springs 35*a*–35*c* are attached to the holster housing 14 to prevent movement of the spring inner ends 76 relative to the housing. For instance, an upright pin 77 can project from the hub 38, and the inner ends 76 of the coil springs can be formed or bent into loops or eyelets that fit over the upright pin to anchor the coil spring inner ends to the housing. Likewise, the outer ends 78 of the coil springs 35*a*–35*c* are attached to the spool center wall 44 to prevent movement of the spring outer ends 78 relative to the spool 34. For instance, the outer ends 78 of the coil springs can be formed into hook portions that project through an upright slot 79 (FIG. 2) formed in the center wall. The coil springs 35*a*–35*c* are mounted within the center cavity 48 so that rotation of the spool 34 in a clockwise direction (as shown in FIG. 3**) generates an increasingly greater spring force.

The cord 56 of the earpiece assembly 52 passes through an aperture in the housing 14 and is directed to the spool 34 by way of pin 80, associated with control arm 36, and pin 82, associated with housing 14. It is contemplated that the cord 56 could pass over rollers or bearing surfaces mounted over the pins 80, 82 to facilitate extending and retracting the earpiece assembly. Free ends 84 of the wires 58–62 associated with the cord 56 are attached to the spool center wall 44 to prevent movement of the wire free ends 84 relative to the spool 34. The wire free ends 84 make electrical contact with the respective coil springs **35*a*–35*c*. Any manner of establishing continuous electrical contact between the wires 58–62 and the coil springs 35*a*–35*c* is contemplated, such as with slip rings, brushes, etc. The inner ends 76 of the coil springs 35*a*–35*c* are electrically coupled to respective ones of the electrical contacts 28, such as by individual wires, circuit board traces, etc. 86. Again, any manner of establishing continuous electrical contact between the coil springs 35*a*–35*c* and the electrical contacts 28 is contemplated. Thus, electrical communication from respective ones of the electrical contacts 28 to the earbud 53 and microphone 54 is established through respective coil springs 35*a*–35*c* and wires 58–62**.

With the free ends 84 of the cord 56 secured to the center wall 44 of the spool 34, and the earbud 53 contacting the holster housing 14, the intermediate portion 88 of the cord 56 is wrapped around the U-shaped cavity portion 46 of the spool 34 in a counter-clockwise manner until the cord intermediate portion 88, extending through the internal cavity 30 from the spool 34 to the earbud 53, is taut.

To use the earpiece assembly 52 when placing an outgoing telephone call or answering an incoming telephone call, the earbud 53 and microphone 54 are extended from the holster housing 14. As the earbud and microphone are extended, the tension force applied by the user to the depending cord 56 i) urges the control arm 36 to pivot away from the spool 34 against the force generated by the spring 74, and ii) rotates the spool 34 in a clockwise direction against the force generated by the coil springs **35*a*–35*c*. It should be appreciated that, with the control arm 36 pivoted away from the spool, the at least one finger 72 is spaced from the ratchet teeth 50, thus avoiding the “clicking” noise that would normally be generated as the rotating ratchet teeth 50 successively pass by the finger 72. Further, as the spool 34 is rotated in a clockwise direction, the spring force generated by the coil springs 35*a*–35*c*** increases.

When the earbud and microphone have been extended to the desired length and the tension on the cord 56 is reduced, the control arm 36 is urged back into contact with the stop 70 by the action of the spring 74. Further, the spool 34 reverses direction and begins to rotate in the opposite or counter-clockwise direction by the action of the coil springs **35*a*–35*c* until a leading, radially-extending, edge 89 of a ratchet tooth 50 engages and positively abuts the at least one control arm finger 72. The telephone 12 can then be taken “off-hook” in a conventional manner to place an outgoing telephone call or answer an incoming telephone call. In both cases, audio signals are coupled from the telephone 12 through the coil spring assembly 35 to the earbud 53. Likewise, voice signals are coupled from the microphone 54 though the coil spring assembly 35 to the telephone 12**.

When incoming and outgoing telephone calls are completed, the telephone 12 can be placed “on-hook” in a conventional manner, and the earpiece assembly 52 retracted back into the holster housing 14. In particular, the protruding first end 66 of the control arm 36 is manually manipulated to pivot the control arm second end 68 away from the stop 70 and pivot the at least one control arm intermediate finger 72 out of engagement with the ratchet tooth 50. With the control arm finger 72 spaced from the ratchet tooth 50, the spring force generated by the coil spring assembly 50 rotates the spool 34 in a counterclockwise direction to wind the intermediate portion 88 of the earpiece assembly cord 56 back around the spool's U-shaped cavity 46 thereby retracting the earbud 53 back into contact with the holster housing 14.

Figure 4:
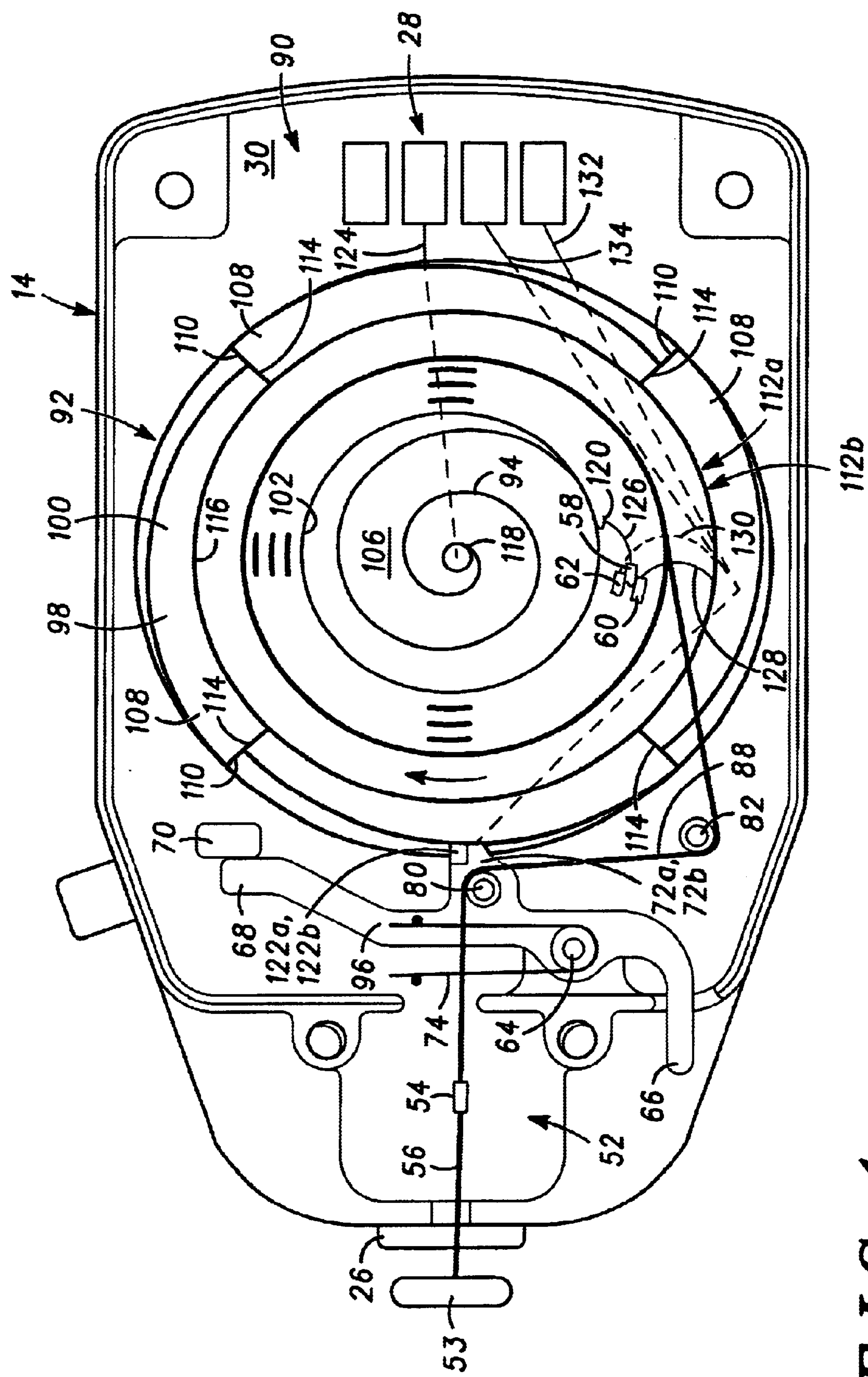
FIG. 4 is a bottom plan view of the holster showing the earpiece assembly, slightly extended from the holster, and the extension/retraction assembly in accordance with another embodiment of the present invention.
Figure 5:
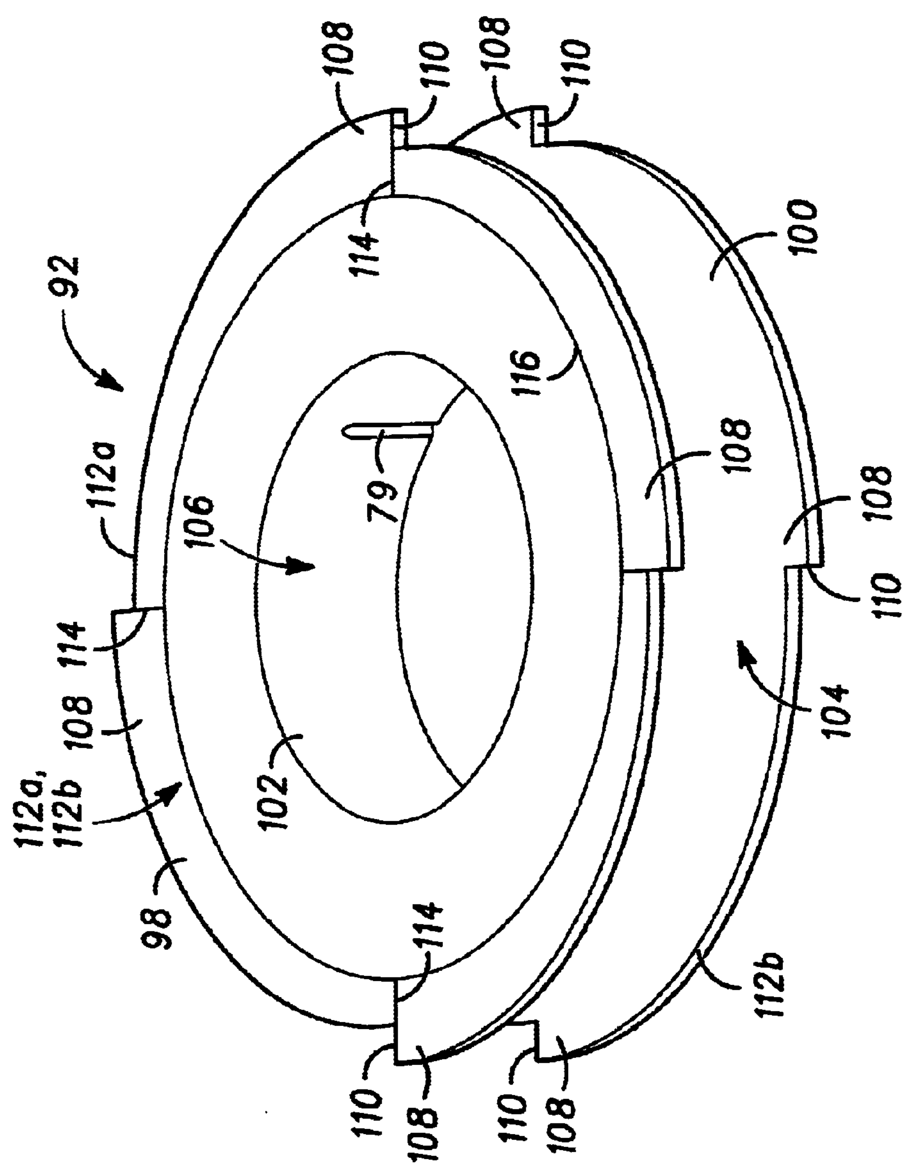
FIG. 5 is a perspective view of a rotatable spool associated with the extension/retraction assembly of FIG. 4.

Referring now to the embodiment of FIGS. 4 and 5, wherein like reference numerals denote the same, or substantially similar components illustrated in FIGS. 1–3, an alternate extension/retraction assembly 90 is shown. As with the extension/retraction assembly 32 of FIG. 2 and 3, the assembly 90 includes a rotatable spool 92, a coil spring 94, and a control arm 96. The spool 92 is rotatably supported by a raised, circular hub 38 (FIG. 2) associated with the lower housing portion 18. The spool 92 includes a first annular sidewall 98 and second annular sidewall 100 spaced from the first sidewall 98 by a circular center wall 102 extending transverse to the sidewalls. The sidewalls 98, 100 and the center wall 102 cooperate to define a U-shaped annular cavity 104 radially outward of the center wall 102. A circular central cavity 106 is defined radially inward of the center wall 102. The radially outer circumferential edge of each sidewall 98, 100 is undulated to define a plurality of circumferentially-spaced ratchet teeth 108. Each ratchet tooth 108 includes a radially outwardly extending leading edge 110.

As best seen in FIG. 5, each spool sidewall 98, 100 includes a respective electrically-conductive spring contact 112*a*, 112*b* secured thereto. In particular, each spring contact 112*a*, 112*b* includes a plurality of wire contact arms 114 extending radially along the leading edge 110 of each ratchet tooth 108. The contact arms 114 each extend from a central wire contact portion 116.

The coil spring 94 is positioned within the spool central cavity 106. An inner end 118 of the coil spring 94 is attached to the holster housing 14 to prevent movement of the spring inner end 118 relative to the housing. Likewise, an outer end 120 of the coil spring 94 is attached to the spool center wall 102 to prevent movement of the spring outer end 120 relative to the spool 92. The coil spring 94 is mounted within the center cavity 106 so that rotation of the spool 92 in a clockwise direction (as shown in FIG. 4) generates an increasingly greater spring force.

The control arm 96 pivots about a pin 64 associated with the housing 14. The control arm 96 includes a first end 66 protruding from the housing 14, a second end 68, shown in abutment with a stop 70 associated with the housing 14, and spaced intermediate fingers 72*a*, 72*b*. With the spool 34 positioned on the hub 38 as shown in FIG. 4, the spring 74 urges the control arm second end 68 into abutment with the stop 70 such that the fingers 72*a*, 72*b* project radially inward of the radially outermost extent of the teeth 50 associated with each of the first and second spool sidewalls 98, 100. Each of the fingers 72*a*, 72*b* includes an electrical contact 122*a*, 122*b*, respectively that cooperates with selective contact arms 114 associated with the respective spring contacts 112 to couple voice and audio signals from the telephone 12 to the earpiece assembly 52 as described further below.

The inner end 118 of the coil spring 94 is electrically coupled to an electrical ground potential contact of the contacts 28, such as by a wire, circuit board trace, etc. 124. Any manner of establishing continuous electrical contact between the coil spring 94 and the electrical ground contact is contemplated. The cord 56 of the earpiece assembly 52 passes through an aperture in the housing 14 and is directed to the spool 92 by way of pin 80, associated with control arm 96, and pin 82, associated with housing 14. A free end 126 of the ground wire 58, associated with the cord 56, is attached to the spool center wall 102 to prevent movement of the ground wire free end 126 relative to the spool 92. The ground wire free end 126 makes electrical contact with the coil spring outer end 120. Any manner of establishing continuous electrical contact between the ground wire 58 and the coil spring 94 is contemplated.

A free end 128 of the earbud wire 60, associated with the cord 56, is attached to the spring contact 112*a* to establish an electrical connection with the spring contact 112*a*, and to prevent movement of the earbud wire free end 128 relative to the spool 92. Likewise, a free end 130 of the microphone wire 62, associated with the cord 56, is attached to the spring contact 112*b* to establish an electrical connection with the spring contact 112*b*, and to prevent movement of the microphone wire free end 130 relative to the spool 92.

The electrical contact 122*a* of the control arm 96 is electrically coupled to a voice signal contact of the electrical contacts 28, such as by a wire, circuit board trace, etc. 132. Likewise, the electrical contact 122*b* of the control arm 96 is electrically coupled to an audio signal contact of the electrical contacts 28, such as by a wire, circuit board trace, etc. 134.

With i) the free end 128 of the earbud wire 60 attached to the spring contact 112*a*, ii) the free end 130 of the microphone wire 62 attached to the spring contact 112*b*, iii) the free end 126 of the ground wire 58 attached to the coil spring outer end 120, and iv) the earbud 53 contacting the holster housing 14, the intermediate portion 88 of the cord 56 is wrapped around the U-shaped cavity portion 104 of the spool 92 in a counter-clockwise manner until the cord intermediate portion 88, extending through the internal cavity 30 from the spool 92 to the earbud 53, is taut.

To use the earpiece assembly 52 when placing an outgoing telephone call or answering an incoming telephone call, the earbud 53 and microphone 54 are extended from the holster housing 14. As the earbud and microphone are extended, the tension force applied by the user to the depending cord 56 i) urges the control arm 96 to pivot away from the spool 92 against the force generated by the spring 74, and ii) rotates the spool 92 in a clockwise direction against the force generated by the coil spring 94. It should be appreciated that, with the control arm 96 pivoted away from the spool 92, the fingers 72*a*, 72*b* are each spaced from the respective ratchet teeth 108, thus avoiding the "clicking" noise that would normally be generated as the rotating ratchet teeth 108 successively pass by the fingers 72*a*, 72*b*. Further, as the spool 92 is rotated in a clockwise direction, the spring force generated by the coil spring 94 increases.

When the earbud and microphone have been extended to the desired length and the tension on the cord 56 is reduced, the control arm 96 is urged back into contact with the stop 70 by the action of the spring 74. Further, the spool 92 reverses direction and begins to rotate in the opposite or counter-clockwise direction by the action of the coil spring 94 until the contact arms 114 associated with the leading, radially-extending, edges 110 of corresponding ratchet teeth 108 positively abut and establish electrical contact with the respective control arm electrical contacts 122*a*, 122*b*. The telephone 12 is taken "off-hook" in a conventional manner to place an outgoing telephone call or answer an incoming telephone call. In both cases, audio signals are coupled from the telephone 12 through one of the contacts 28, electrical trace 132, control arm contact 122*a* spring; contact 112*a*, and earbud wire 60, to earbud 53. Likewise, voice signals are coupled from the microphone 54 though microphone wire 62, spring contact 112*b*, control arm contact 122*b*, electrical trace 134, and one of the contacts 28, to the telephone 12. The electrical ground potential is coupled from the telephone 12, to one or more of the electrical contacts 28, electrical trace 124, coil spring 94, and ground wire 58, to the earbud and microphone.

When incoming and outgoing telephone calls are completed, the telephone 12 can be placed "on-hook" in a conventional manner, and the earpiece assembly 52 retracted back into the holster housing 14. In particular, the protruding first end 66 of the control arm 96 is manually manipulated to pivot the control arm second end 68 away from the stop 70 and pivot the control arm intermediate fingers 72*a*, 72*b* out of engagement with the ratchet teeth 108. With the control arm fingers 72*a*, 72*b* spaced from the ratchet teeth 108, the spring force generated by the coil spring 94 rotates the spool 92 in a counterclockwise direction to wind the earpiece assembly cord 56 around the spool's U-shaped cavity 104 and to retract the earbud 53 back into contact with the holster housing 14.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, the coil spring assembly 35 could be formed with the coil springs 35*a*–35*c* oriented in a concentric, rather and stacked, arrangement within the spool center cavity. In addition, the earpiece assembly cord 56 could include a bayonet-type connector at a free end thereof, which connector could be mated to a receptacle associated with either the housing 14 or the telephone 12, while an intermediate portion of the cord is taken-up and released by the extension/retraction assembly 32, 90. Thus, it is contemplated that the earpiece assembly could be electrically coupled to the telephone without being electrically routed through the extension/retraction assembly.

We claim:

1. A holster for a telecommunication device, the holster comprising:

a housing adapted to receive the telecommunication device;

an earpiece assembly including at least one transducer and a cord depending from the at least one transducer, the earpiece assembly being extendable and retractable relative to the housing; and an extension/retraction assembly including a spool for taking up at least a portion of the cord when the earpiece assembly is retracted relative to the housing, and at least one coil spring adapted to rotate the spool, the at least one coil spring electrically coupling the at least one transducer of the earpiece assembly to the telecommunication device, when the telecommunication device is received by said housing.

2. The holster of claim 1, wherein the earpiece assembly includes at least one transducer from the group consisting of an earbud and a microphone.

3. The holster of claim 1, wherein the extension/retraction assembly includes a first coil spring, a second coil spring, and a third coil spring; and the cord includes a ground wire electrically coupled to the first coil spring, an earbud wire electrically coupled to the second coil spring, and a microphone wire electrically coupled to the third coil spring.

4. The holster of claim 3, wherein the housing includes a first contact electrically coupled to the first coil spring, a second contact electrically coupled to the second coil spring, and a third contact electrically coupled to the third coil spring, the first, second, and third electrical contacts electrically mating with corresponding electrical contacts associated with the telecommunication device when mounted to the housing.

5. The holster of claim 1, wherein the spool includes a plurality of ratchet teeth positioned around a periphery thereof; and the extension/retraction assembly further includes a pivotal control arm having at least one finger adapted to engage one of the plurality of ratchet teeth in an extended position of the earpiece assembly.

6. The holster of claim 1, wherein the spool includes a spring contact electrically coupled to the cord; and the extension/retraction assembly further includes a pivotal control arm having at least one contact electrically coupled to the telecommunication device, the spring contact engaging the at least one control arm contact in an extended position of the earpiece assembly to further electrically couple the at least one transducer to the telecommunication device.

7. The holster of claim 6, wherein the spring contact is associated with one of a plurality of ratchet teeth positioned around a periphery of the spool, and the at least one control arm contact is associated with a control arm finger adapted to engage the one of the plurality of ratchet teeth in the extended position of the earpiece assembly.

8. The holster of claim 1, wherein the extension/retraction assembly further includes a control arm that prevents rotation of the spool in an extended position of the earpiece assembly, the control arm adapted to selectively pivot out of engagement with the spool to facilitate retraction of the earpiece assembly relative to the housing.

9. The holster of claim 8, where the control arm is spring-biased into engagement with the spool.

10. The holster of claim 1, wherein the earpiece assembly includes an earbud and a microphone;

the cord includes an earbud wire depending from the earbud, and a microphone wire depending from the microphone;

the spool includes a first spring contact electrically coupled to the earbud wire, and a second spring contact electrically coupled to the microphone wire; and the extension/retraction assembly further includes a control arm having first and second contacts electrically coupled to the telecommunication device wherein the first spring contact engages the first control arm contact, and the second spring contact engages the second control arm contact in an extended position of the earpiece assembly.

11. A holster for a telecommunication device, the holster comprising:

a housing having an internal cavity and means adapted to receive the telecommunication device;

an earpiece assembly including at least one transducer and a cord depending from the at least one transducer, the earpiece assembly being extendable and retractable relative to the housing; and an extension/retraction assembly including a spool positioned within the internal cavity for taking up at least a portion of the cord when the earpiece assembly is retracted relative to the housing, and means for rotating the spool to retract the earpiece assembly relative to the housing, including at least one coil spring, the at least one coil spring electrically coupling the at least one transducer of the earpiece assembly to the telecommunication device, when the telecommunication device is received by said housing.

12. The holster of claim 11, wherein the spool rotating means includes a first coil spring, a second coil spring, and a third coil spring; and the cord includes a ground wire electrically coupled to the first coil spring, an earbud wire electrically coupled to the second coil spring, and a microphone wire electrically coupled to the third coil spring.

13. The holster of claim 12, wherein the housing includes a first contact electrically coupled to the first coil spring, a second contact electrically coupled to the second coil spring, and a third contact electrically coupled to the third coil spring, the first, second, and third electrical contacts electrically mating with corresponding electrical contacts associated with the telecommunication device when mounted to the housing.

14. The holster of claim 11, wherein the earpiece assembly includes an earbud and a microphone;

the cord includes an earbud wire depending from the earbud, and a microphone wire depending from the microphone;

the spool includes a first spring contact electrically coupled to the earbud wire, and a second spring contact electrically coupled to the microphone wire; and the extension/retraction assembly further includes a control arm having first and second contacts electrically coupled to the telecommunication device wherein the first spring contact engages the first control arm contact, and the second spring contact engages the second control arm contact in an extended position of the earpiece assembly.

15. The holster of claim 11, wherein the spool includes a spring contact electrically coupled to the cord; and the extension/retraction assembly further includes a pivotal control arm having at least one contact electrically coupled to the telecommunication device, the spring contact engaging the at least one control arm contact in an extended position of the earpiece assembly to further electrically couple the at least one transducer to the telecommunication device.

16. The holster of claim 15, wherein the spring contact is associated with one of a plurality of ratchet teeth positioned around a periphery of the spool, and the at least one control arm contact is associated with a control arm finger adapted to engage the one of the plurality of ratchet teeth in the extended position of the earpiece assembly.

17. The holster of claim 11, wherein the earpiece assembly includes at least one transducer from the group consisting of an earbud and a microphone.

18. The holster of claim 11, wherein the spool includes a plurality of ratchet teeth positioned around a periphery thereof; and the extension/retraction assembly further includes a pivotal control arm having at least one finger adapted to engage one of the plurality of ratchet teeth in an extended position of the earpiece assembly.

19. The holster of claim 11, wherein the extension/retraction assembly further includes a spring-biased control arm that prevents rotation of the spool in an extended position of the earpiece assembly, the control arm adapted to selectively pivot out of engagement with the spool to facilitate retraction of the earpiece assembly relative to the housing.

* * * * *